United States Patent
Gaal et al.

(10) Patent No.: US 9,648,576 B2
(45) Date of Patent: May 9, 2017

(54) TIMING ADJUSTMENT FOR SYNCHRONOUS OPERATION IN A WIRELESS NETWORK

(71) Applicant: QUALCOMM Incorporated, San Diego, CA (US)

(72) Inventors: Peter Gaal, San Diego, CA (US); Ravi Palanki, Cupertino, CA (US); Tingfang Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 334 days.

(21) Appl. No.: 14/506,886

(22) Filed: Oct. 6, 2014

(65) Prior Publication Data

US 2015/0023296 A1   Jan. 22, 2015

Related U.S. Application Data

(62) Division of application No. 12/712,755, filed on Feb. 25, 2010, now Pat. No. 8,886,205.

(Continued)

(51) Int. Cl.
*H04W 56/00*   (2009.01)

(52) U.S. Cl.
CPC ... *H04W 56/0045* (2013.01); *H04W 56/0005* (2013.01)

(58) Field of Classification Search
CPC .... H04W 24/02; H04W 72/082; H04W 92/20

(Continued)

(56) References Cited

U.S. PATENT DOCUMENTS

| | | |
|---|---|---|
| 5,987,023 A | 11/1999 | Albrow et al. |
| 7,643,515 B2 | 1/2010 | Willenegger |

(Continued)

FOREIGN PATENT DOCUMENTS

| | | |
|---|---|---|
| CN | 1115196 A | 1/1996 |
| CN | 1404668 A | 3/2003 |

(Continued)

OTHER PUBLICATIONS

Ericsson: "Single antenna interference cancellation A capacity estimation in unsynchronised networks"3GPP Draft; GP-031202, 3rd Generation Partnership Project (3GPP), Mobile Competence Centre ; 650, Route Des Lucioles ; F-06921 Sophia-Antipolis Cedex; France, vol.tsg_geran\TSG_GERAN\GERAN_15_Fort_Lauderdale\Docs, no. Fort Lauderdale, USA; 20030623, Jun. 19, 2003 (Jun. 19, 2003), XP050008475.

(Continued)

*Primary Examiner* — Sam Bhattacharya
(74) *Attorney, Agent, or Firm* — Ashish L. Patel

(57) ABSTRACT

Techniques for adjusting transmit timing of base stations and user equipments (UEs) in a wireless network are described. In one operating scenario, a femto base station communicates with a femto UE, and a macro base station communicates with a macro UE located within the coverage of the femto base station. In an aspect, the transmit timing of the femto base station may be delayed relative to the transmit timing of the macro base station, e.g., to time align downlink signals from the femto and macro base stations at the femto and macro UEs. In another aspect, the transmit timing of the femto UE may be advanced relative to the transmit timing of femto base station by an amount larger than twice the propagation delay between the femto UE and the femto base station, e.g., to time align uplink signals from the femto and macro UEs at the femto base station.

26 Claims, 9 Drawing Sheets

Related U.S. Application Data

(60) Provisional application No. 61/156,816, filed on Mar. 2, 2009.

(58) Field of Classification Search
USPC .................. 455/450, 456.1, 456.5, 502.524
See application file for complete search history.

(56) References Cited

U.S. PATENT DOCUMENTS

| | | | |
|---|---|---|---|
| 2003/0139188 A1* | 7/2003 | Chen | H04W 64/00 455/456.1 |
| 2004/0233875 A1 | 11/2004 | Hayashi | |
| 2006/0193306 A1 | 8/2006 | Higure | |
| 2007/0155315 A1 | 7/2007 | Lee et al. | |
| 2007/0293157 A1 | 12/2007 | Haartsen et al. | |
| 2008/0219190 A1 | 9/2008 | Haartsen | |
| 2010/0222068 A1 | 9/2010 | Gaal et al. | |
| 2013/0237236 A1 | 9/2013 | Abraham et al. | |

FOREIGN PATENT DOCUMENTS

| | | |
|---|---|---|
| CN | 1989775 A | 6/2007 |
| CN | 101174869 A | 5/2008 |
| CN | 101174880 A | 5/2008 |
| EP | 0676908 | 10/1995 |
| EP | 2019509 A1 | 1/2009 |
| JP | 2002077087 A | 3/2002 |
| JP | 2007184935 A | 7/2007 |
| JP | 2009010509 A | 1/2009 |
| TW | 511361 B | 11/2002 |
| WO | 9809390 A1 | 3/1998 |
| WO | 2005062798 A2 | 7/2005 |
| WO | 2006052932 | 5/2006 |
| WO | 2007067006 A1 | 6/2007 |
| WO | 2008024788 A2 | 2/2008 |

OTHER PUBLICATIONS

European Search Report—EP12161259—Search Authority—Munich—Apr. 23, 2012.

Guang Han, Stavros Tzavidas, Hua Xu; Motorola: Yang Xiangying; Intel: "Time synchronization for Femtocells"[Online] Nov. 12, 2008 (Nov. 12, 2008), pp. 1-3, XP002585802 IEEE 802.16 Broadband Wireless Access Working Group Retrieved from the Internet: URL: http://www.ieee802.org/16/tgm/contrib/C80216m-08_1368r1.doc.

International Search Report and Written Opinion—PCT/US2010/025947, International Search Authority—European Patent Office—Oct. 28, 2010.

Qualcomm Europe: "Analysis of Uplink Timing for TDD HeNB" 3GPP Draft; R4-092483 Uplink Timing Analysis, 3rd Generation Partnership Project (3GPP), Mobile Competence Centre ; 650, Route Des Lucioles ; F-06921 1 Sophia-Antipolis Cedex ; France, no. Los Angeles, CA; 20090625, Jun. 25, 2009 (Jun. 25, 2009) XP050353707 [retrieved on 2009-06-251.

Su Huan, et al., "Interference Avoidance Scheme in the 802.16m Femto Cell Environments", IEEE 802.16 Broadband Wireless Access Working Group <http://ieee802.org/16>, Jan. 2009 (Jan. 5, 2009), XP002585806, Retrieved from the Internet: URL: http://www,ieee802.org/I6/tgm/contrib/C80216m-09_0009.doc [retrieved-on Jun. 1, 2010].

Taiwan Search Report—TW099105983—TIPO—Mar. 5, 2013.

Yung-Ting Lee, et al., "Time Synchronization Methods for Femtocell" [Online] Nov. 5, 2008 (Nov. 5, 2008), XP002585803 IEEE 802.16m-08/040 Retrieved from the Internet: URL:http://www.ieee802.org/16/tgm/contrib/C80216m-08_1323rl.ppt> [retrieved-on Jun. 1, 2010].

CATT: "Analysis on Cell Synchronization Accuracy Requirement," R4-081908, Aug. 22, 2008, 5 pages.

\* cited by examiner

FIG. 10

TIMING ADJUSTMENT FOR SYNCHRONOUS OPERATION IN A WIRELESS NETWORK

The present application for patent is a divisional of patent application Ser. No. 12/712,755, entitled "TIMING ADJUSTMENT FOR SYNCHRONOUS OPERATION IN A WIRELESS NETWORK," filed Feb. 25, 2010, allowed, which claims priority to provisional U.S. Application Ser. No. 61/156,816, entitled "A METHOD AND APPARATUS FOR UPLINK AND DOWNLINK TIMING ADJUSTMENT FOR LOW POWER CELLS," filed Mar. 2, 2009, assigned to the assignee hereof and hereby expressly incorporated herein by reference.

BACKGROUND

I. Field

The present disclosure relates generally to communication, and more specifically to techniques for supporting communication in a wireless communication network.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station. The wireless network may support synchronous operation on the downlink and uplink. It may be desirable to properly adjust transmit timing of base stations and UEs in order to achieve good performance.

SUMMARY

Techniques for adjusting transmit timing of base stations and UEs in a wireless network are described herein. In one operating scenario, a femto base station may communicate with a femto UE, and both may be located within the coverage of a macro base station. A macro UE may communicate with the macro base station and may be located within the coverage of the femto base station. The different types of base stations and UEs are described below. The femto UE and the macro UE may observe high interference due to their close proximity. The high interference may be mitigated with proper transmit timing for the femto base station and the femto UE.

In an aspect, the transmit timing of the femto base station may be delayed relative to the transmit timing of the macro base station. In one design, the femto base station may determine the propagation delay between the macro base station and the macro UE, or the femto UE, or the femto base station. The femto base station may determine an amount of delay for its transmit timing based on the propagation delay. The femto base station may determine a reference time (e.g., GPS time) used for the transmit timing of the macro base station. The femto base station may then delay its transmit timing by the determined amount of delay from the reference time. The femto base station may also adjust its transmit timing in other manners, as described below. In one design, the transmit timing of the femto base station may be adjusted to time align downlink signals from the femto and macro base stations at the femto and macro UEs.

In another aspect, the transmit timing of the femto UE may be advanced relative to the transmit timing of femto base station by an amount larger than twice the propagation delay between the femto UE and the femto base station. In one design, the femto base station may determine a macro propagation delay, which may be the propagation delay between the macro base station and the macro UE, or the femto UE, or the femto base station. The femto base station may determine an amount of advance for the transmit timing of the femto UE based on the macro propagation delay. The femto base station may then advance the transmit timing of the femto UE by the determined amount of advance from the reference time. The transmit timing of the femto UE may be advanced by twice the macro propagation delay relative to the transmit timing of the femto base station. The transmit timing of the femto UE may also be adjusted in other manners, as described below. In one design, the transmit timing of the femto UE may be adjusted to time align uplink signals from the femto UE and the macro UE at the femto base station.

The techniques described herein may also be used for other types of base stations and UEs. Various aspects and features of the disclosure are described in further detail below.

BRIEF DESCRIPTION OF THE DRAWINGS

FIGS. 9 and 10 show processes for adjusting transmit timing of a UE.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, certain aspects of the techniques are described below for LTE, and LTE terminology is used in much of the description below.

Figure 1:
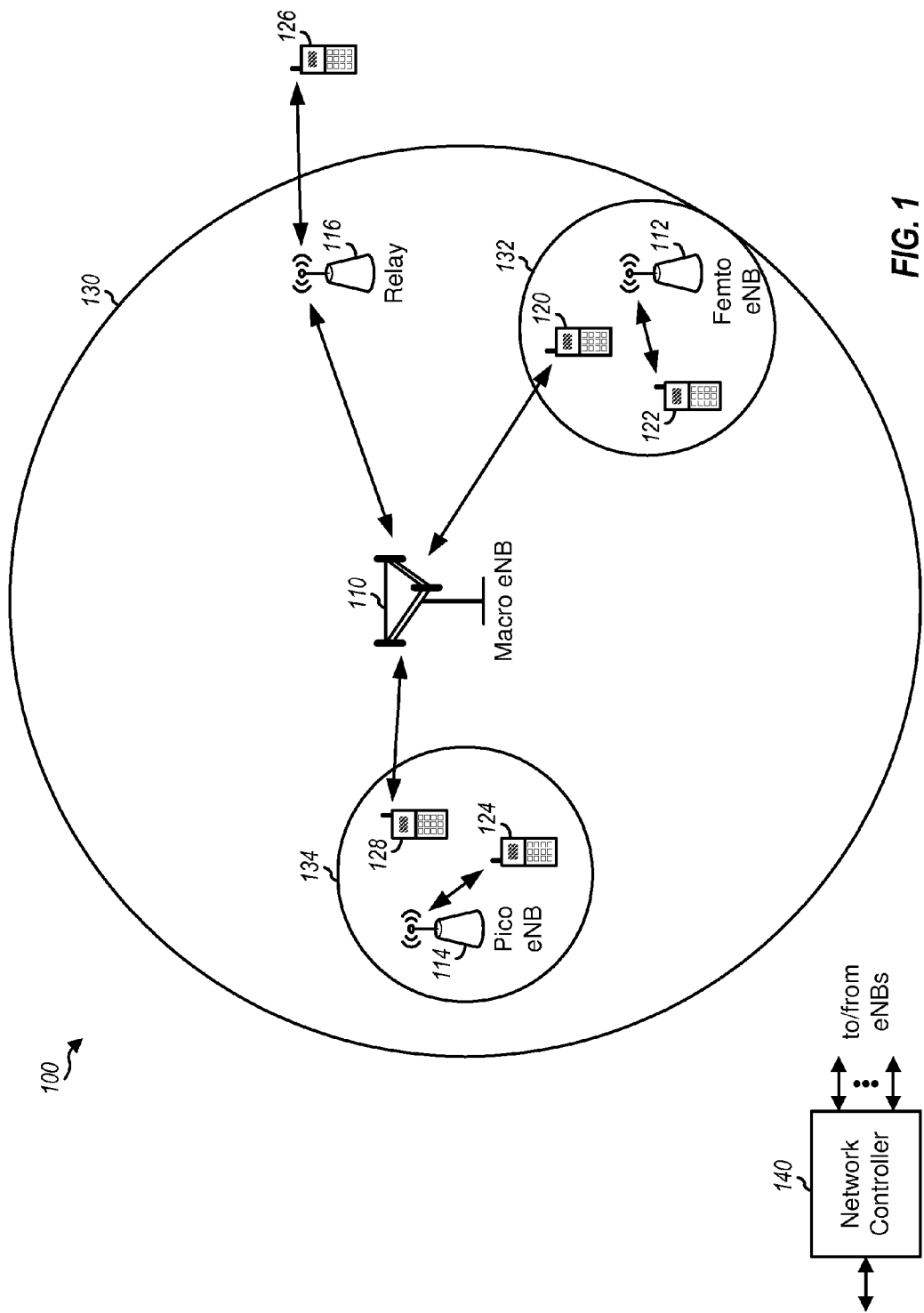
FIG. 1 shows a wireless communication network.

FIG. 1 shows a wireless communication network 100, which may be an LTE network or some other wireless network. Wireless network 100 may include a number of evolved Node Bs (eNBs) 110, 112 and 114 and other network entities. An eNB may be a station that communicates with the UEs and may also be referred to as a base station, a Node B, an access point, etc. Each eNB may provide communication coverage for a particular geographic area. In 3GPP, the term "cell" can refer to a coverage area of an eNB and/or an eNB subsystem serving this coverage area, depending on the context in which the term is used.

An eNB may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). An eNB for a macro cell may be referred to as a macro eNB. An eNB for a pico cell may be referred to as a pico eNB. An eNB for a femto cell may be referred to as a femto eNB or a home eNB (HeNB). In the example shown in FIG. 1, eNB 110 may be a macro eNB for a macro cell 130, eNB 112 may be a femto eNB for a femto cell 132, and eNB 114 may be pico eNB for a pico cell 134. An eNB may support one or multiple (e.g., three) cells.

Wireless network 100 may also include relay stations. A relay station is a station that receives a transmission of data from an upstream station (e.g., an eNB or a UE) and sends a transmission of the data to a downstream station (e.g., a UE or an eNB). A relay station may also be a UE that relays transmissions for other UEs. In the example shown in FIG. 1, a relay station 116 may communicate with macro eNB 110 and a UE 126 in order to facilitate communication between eNB 110 and UE 126. A relay station may also be referred to as a relay eNB, a relay base station, a relay, etc.

Wireless network 100 may be a heterogeneous network that includes eNBs of different types, e.g., macro eNBs, pico eNBs, femto eNBs, relays, etc. These different types of eNBs may have different transmit power levels, different coverage areas, and different impact on interference in wireless network 100. For example, macro eNBs may have a high transmit power level (e.g., 20 Watts) whereas pico eNBs, femto eNBs, and relays may have a lower transmit power level (e.g., 2 Watt).

A network controller 140 may couple to a set of eNBs and may provide coordination and control for these eNBs. Network controller 140 may communicate with the eNBs via a backhaul. The eNBs may also communicate with one another, e.g., directly or indirectly via a wireless or wireline backhaul.

UEs 120 through 128 may be dispersed throughout wireless network 100, and each UE may be stationary or mobile. A UE may also be referred to as a terminal, a mobile station, a subscriber unit, a station, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with macro eNBs, pico eNBs, femto eNBs, relays, etc. In FIG. 1, a solid line with double arrows indicates communication between a UE and a serving eNB, which is an eNB designated to serve the UE on the downlink and/or uplink. A UE served by a macro eNB may be referred to as a macro UE (MUE). A UE served by a femto eNB may be referred to as a femto UE or a home UE (HUE).

LTE utilizes orthogonal frequency division multiplexing (OFDM) on the downlink and single-carrier frequency division multiplexing (SC-FDM) on the uplink. OFDM and SC-FDM partition a frequency range into multiple ($N_{FFT}$) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers ($N_{FFT}$) may be dependent on the system bandwidth. For example, $N_{FFT}$ may be equal to 128, 256, 512, 1024 or 2048 for system bandwidth of 1.25, 2.5, 5, 10 or 20 megahertz (MHz), respectively.

The wireless network may utilize frequency division duplexing (FDD) or time division duplexing (TDD). For FDD, the downlink and uplink may be allocated separate frequency channels, and transmissions may be sent concurrently on the downlink and uplink via the separate frequency channels. For TDD, the downlink and uplink may share the same frequency channel, which may be used for the downlink some of the time and for the uplink some other time.

Figure 2:
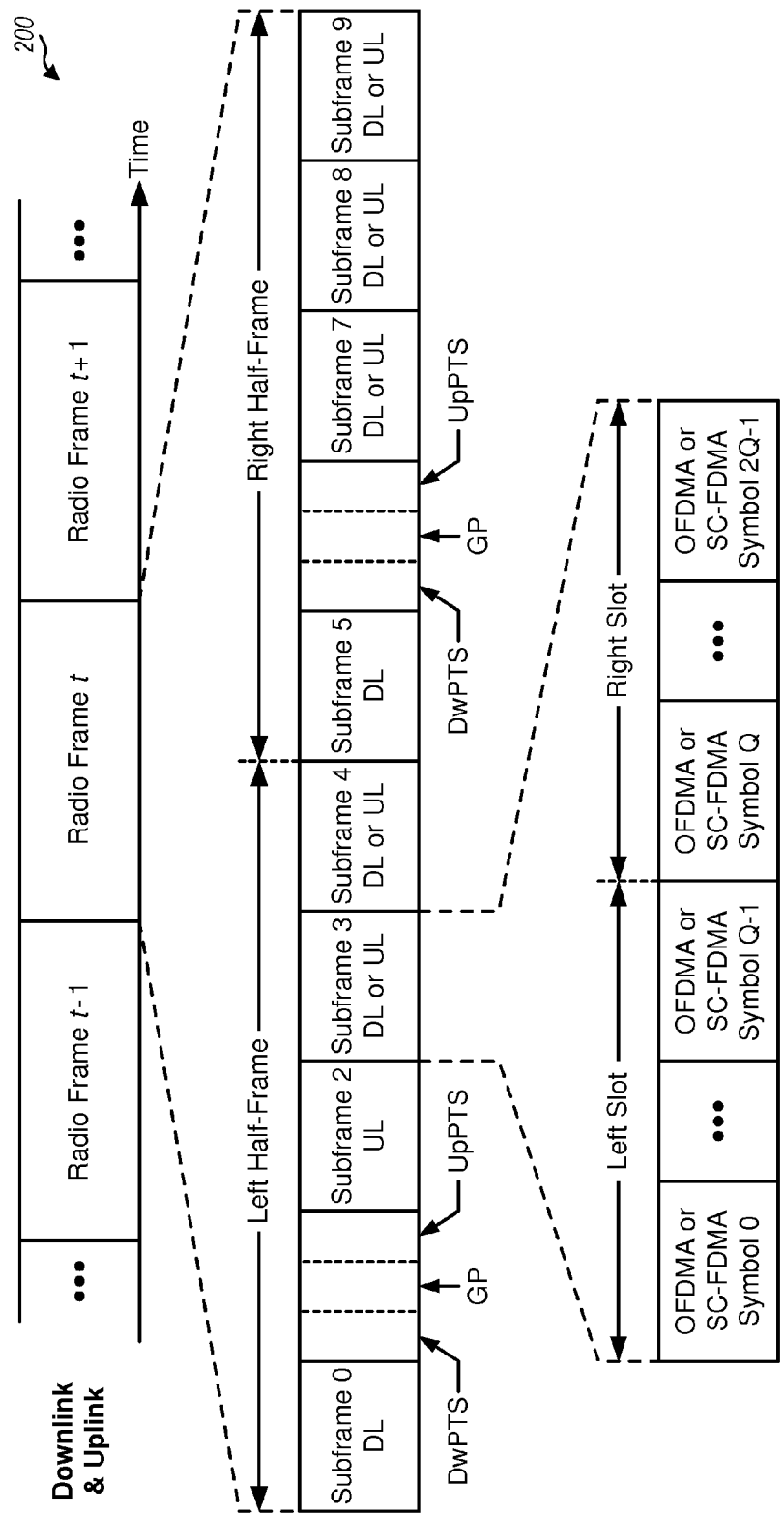
FIG. 2 shows an exemplary frame structure.

FIG. 2 shows an exemplary TDD frame structure 200 used in LTE. The transmission timeline may be partitioned into units of radio frames. Each radio frame may have a predetermined duration, e.g., 10 milliseconds (ms), and may be partitioned into two half-frames. Each radio frame may also be partitioned into 10 subframes with indices of 0 through 9. Each subframe usable for data transmission may be partitioned into two slots. Each slot may include six symbol periods for an extended cyclic prefix or seven symbol periods for a normal cyclic prefix. One OFDMA symbol or one SC-FDMA symbol may be sent in each symbol period.

A number of downlink-uplink configurations are supported by LTE for TDD. Each downlink-uplink configuration indicates whether each subframe is a downlink (DL) subframe used for the downlink, or an uplink (UL) subframe used for the uplink, or a special subframe. Subframes 0 and 5 are used for the downlink and subframe 2 is used for the uplink for all downlink-uplink configurations. Subframes 3, 4, 7, 8 and 9 may each be used for the downlink or uplink depending on the downlink-uplink configuration. Subframe 1 is a special subframe with three special fields for a downlink pilot time slot (DwPTS), a guard period (GP), and an uplink pilot time slot (UpPTS). Subframe 6 may be (i) a special subframe with only the DwPTS or all three special fields or (ii) a downlink subframe, depending on the downlink-uplink configuration. The DwPTS, GP, and DwPTS fields may have different durations for different special subframe configurations.

The wireless network may support synchronous operation, which may be required for TDD so that downlink and uplink transmissions to not interfere with one another and degrade the performance of both the downlink and uplink. In one design, synchronization may be achieved by satisfying the following conditions:

1. A given UE (e.g., a macro UE or a femto UE) receives downlink signals from all relevant eNBs at the same time (e.g., within a cyclic prefix),
2. A given eNB receives uplink signals from all relevant UEs at the same time (e.g., within a cyclic prefix),
3. No entity (e.g., eNB or UE) has to transmit and receive at the same time, and
4. No UE transmits on a frequency channel at the same time in which another UE, located in the vicinity, is receiving.

A downlink signal is a signal transmitted by an eNB/base station on the downlink. A downlink signal may carry a downlink transmission of data and/or other information. An uplink signal is a signal transmitted by a UE on the uplink. An uplink signal may carry an uplink transmission of data and/or other information. Conditions 1 and 2 are applicable for TDD, FDD, and Coordinated MultiPoint (CoMP) transmission. CoMP refers to coordinate transmission from multiple cells to one or more UEs. Conditions 3 and 4 are applicable for TDD.

In one scheme to satisfy condition 1, all eNBs in the wireless network may adjust their transmit timing to be time aligned to a common reference time, which may be Global Positioning Satellite (GPS) time or some other time source. For example, each eNB may determine GPS time based on its GPS receiver and may set its transmit timing to GPS time. A femto eNB may also measure the receive time of a downlink transmission from a macro eNB, estimate the propagation delay of the downlink transmission, and advance its transmit timing relative to the measured receive time by the propagation delay. The eNBs may also align their transmit timing in other manners. In any case, all eNBs may transmit downlink signals that are aligned in time due to their aligned transmit timing. This scheme may provide good performance in a homogenous network with eNBs of only one type, e.g., only macro eNBs. This scheme may provide sub-optimal performance in a heterogeneous network with eNBs of different types, e.g., macro eNBs and femto eNBs, as described below.

In one scheme to satisfy condition 2, all UEs in the wireless network may have their transmit timing adjusted by their serving eNBs such that the uplink signals from the UEs are time aligned at the serving eNBs. This scheme may provide good performance in a homogenous network but may provide sub-optimal performance in a heterogeneous network, as described below.

The schemes described above for adjusting the transmit timing of eNBs and UEs may not provide good performance in a heterogeneous network for several reasons. First, the macro eNBs and the femto/pico eNBs typically have substantially different cell sizes (i.e., different size coverage areas), which would result in very different propagation delays in macro and femto/pico cells. Second, the macro eNBs and the femto/pico eNBs typically have substantially different transmit power levels, which may result in high interference in certain operating scenarios, as described below.

Figure 3:
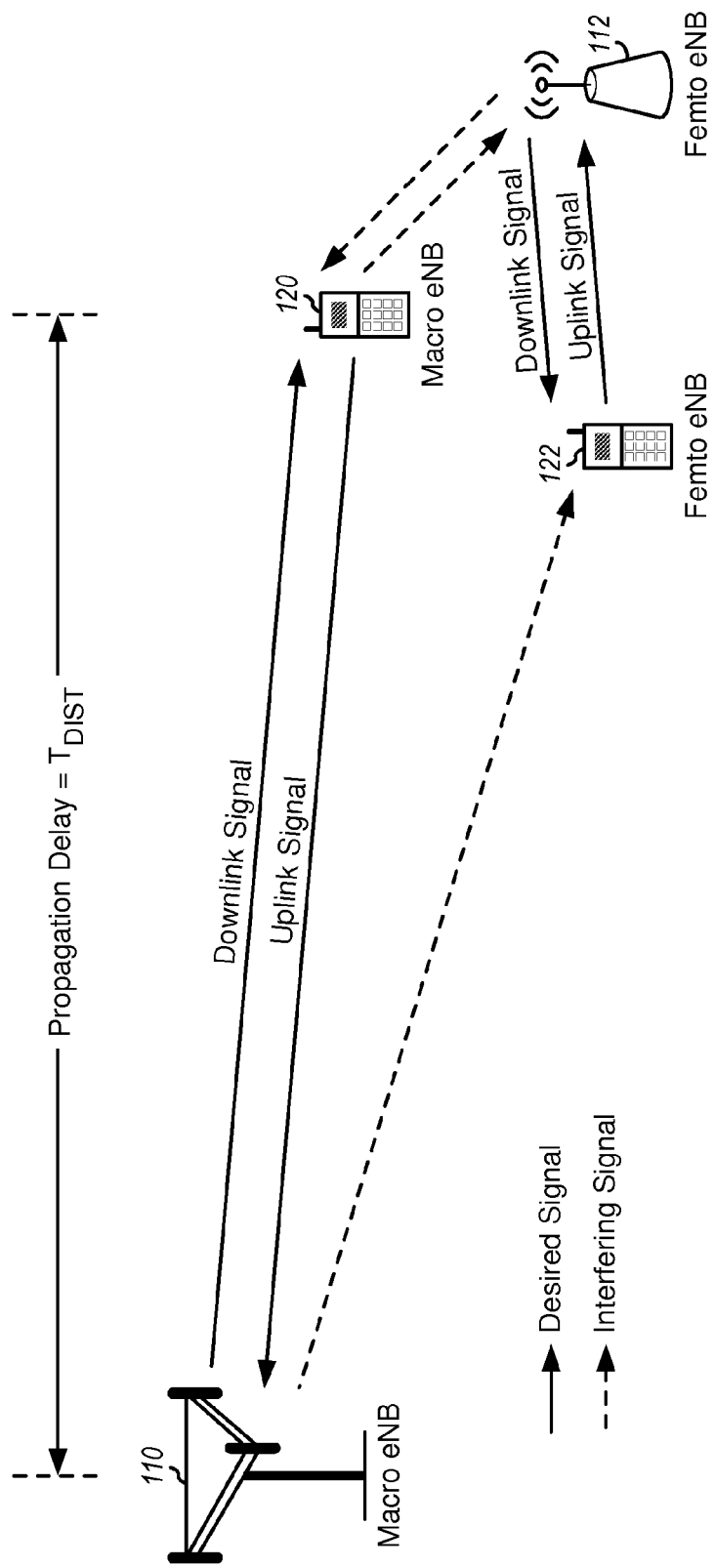
FIG. 3 shows an operating scenario with two base stations and two UEs.

FIG. 3 shows an exemplary operating scenario with two eNBs and two UEs. In this scenario, macro eNB 110 may communicate with macro UE 120 on the downlink and uplink, and femto eNB 112 may communicate with femto UE 122 on the downlink and uplink. Macro UE 120 may be located far away from macro eNB 110 and close to femto eNB 112. Macro UE 120 may not be able to access femto eNB 112 due to restricted association.

UEs 120 and 122 may operate in a dominant interference scenario in the example shown in FIG. 3. On the downlink, macro UE 120 may observe high interference from femto eNB 112 due to the close proximity to femto eNB 112. On the uplink, macro UE 120 may need to transmit at a high power level in order to reach macro eNB 110 and may then cause high interference to femto eNB 112. On the downlink, femto UE 122 may observe high interference from macro eNB 110 due to the higher transmit power level of macro eNB 110. The high interference on the downlink and uplink may degrade performance of both UEs 120 and 122.

To mitigate high interference, different time and/or frequency resources may be reserved for UEs 120 and 122. Each UE may then communicate using its reserved resources, which may be cleared of interference due to the other UE. However, synchronization should be achieved for UEs 120 and 122 and femto eNB 112 in order for the reserved resources to mitigate interference as expected. One reason is because orthogonality between subcarriers on different signals transmitted with OFDMA or SC-FDMA may be maintained if these signals are received within a cyclic prefix. If condition 2 is not satisfied and femto eNB 112 does not receive the uplink signals from UEs 120 and 122 within the cyclic prefix, then orthogonality between subcarriers on the uplink signals from UEs 120 and 122 would not be maintained. In this case, UE 120 may cause interference to UE 122 on the uplink even though both UEs transmit on different resources. Similarly, if condition 1 is not satisfied and femto UE 122 does not receive the downlink signals from eNBs 110 and 112 within the cyclic prefix, then orthogonality between subcarriers on the downlink signals from eNBs 110 and 112 would not be maintained. In this case, macro eNB 110 may cause high interference to femto UE 122 on the downlink even though eNBs 110 and 112 transmit on different resources to UEs 120 and 122, respectively.

In an aspect, the transmit timing of femto eNB 112 may be delayed relative to the transmit timing of macro eNB 110 in order to satisfy condition 1 for femto UE 122 and macro UE 120. This timing adjustment is in contrast to the scheme described above in which the transmit timing of all eNBs are aligned, e.g., to GPS time or some other time source. This timing adjustment may improve performance of downlink transmission to femto UE 122.

In another aspect, the transmit timing of femto UE 122 may be advanced relative to the transmit timing of femto eNB 112 in order to satisfy condition 2 for femto eNB 112. This timing adjustment is in contrast to the scheme described above in which the transmit timing of UEs are adjusted to align uplink signals at the serving eNBs. This timing adjustment may improve performance of uplink transmission from femto UE 122.

Figure 4:
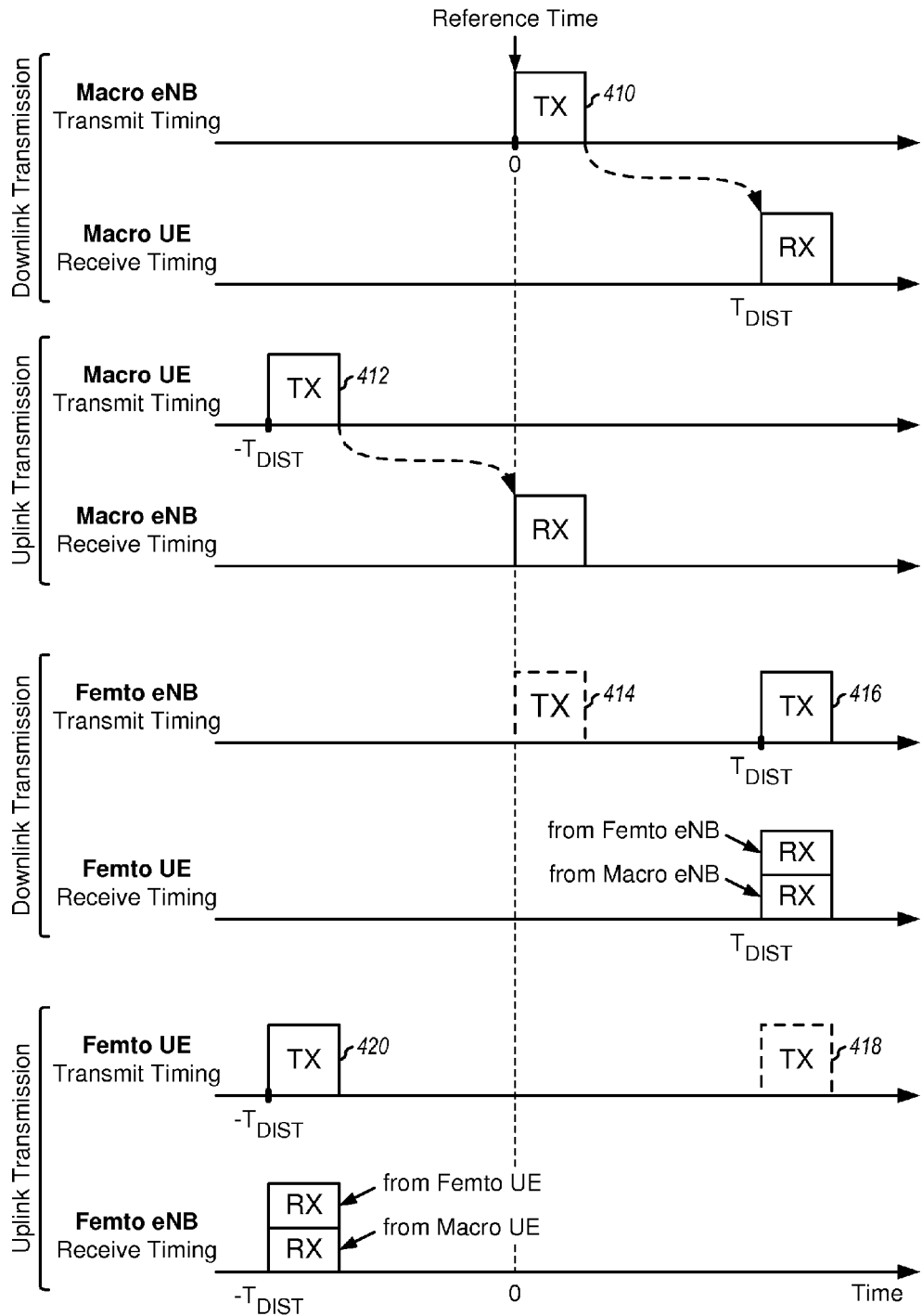
FIG. 4 shows a timing diagram of downlink and uplink transmissions from the base stations and UEs in FIG. 3.

FIG. 4 shows a timing diagram of downlink transmissions from eNBs 110 and 112 and uplink transmissions from UEs 120 and 122 in FIG. 3. Macro eNB 110 may send a downlink transmission 410 at time 0, which may be aligned to a reference time such as GPS time. Downlink transmission 410 from macro eNB 110 may be received by macro UE 120 at time $T_{DIST}$, which may be the propagation delay between eNB 110 and UE 120. Macro UE 120 may have its transmit timing advanced by $T_{DIST}$ relative to the transmit timing of macro eNB 110. In this case, if macro UE 120 sends an uplink transmission 412 at time $-T_{DIST}$, then this uplink transmission would be received by macro eNB 110 at time 0. The transmit timing of macro UE 120 may thus be advanced so that the downlink and uplink transmissions are time aligned at macro eNB 110.

Femto eNB 112 may align its transmit timing with the transmit timing of macro eNB 110 and may send a downlink transmission 414 at time 0. For simplicity, the femto cell may be assumed to have a very small radius as compared to the macro cell, and the propagation delay between femto eNB 112 and femto UE 122 may be assumed to be negligible. In this case, femto UE 122 may receive downlink transmission 414 from femto eNB 112 at time 0 and may also receive downlink transmission 410 from macro eNB 110 at time $T_{DIST}$. Orthogonality between downlink transmissions 410 and 414 from eNBs 110 and 112, respectively, may not be maintained with femto eNB 112 aligning its transmit timing with the transmit timing of macro eNB 110.

To satisfy condition 1, femto eNB 112 may delay its transmit timing by $T_{DIST}$ relative to the transmit timing of macro eNB 110. Femto eNB 112 may send a downlink transmission 416 at time $T_{DIST}$. Femto UE 122 may receive downlink transmission 416 from femto eNB 112 as well as downlink transmission 410 from macro eNB 110 at time $T_{DIST}$. Orthogonality between downlink transmissions 410 and 416 from eNBs 110 and 112 may be maintained with femto eNB 112 advancing its transmit timing by $T_{DIST}$ relative to the transmit timing of macro eNB 110.

Femto UE 122 may have its transmit timing delayed by $T_{DIST}$, which may be twice the negligible propagation delay between femto eNB 112 and femto UE 122. In this case, if femto UE 122 sends an uplink transmission 418 at time $T_{DIST}$, then this uplink transmission would be received by femto eNB 112 at time $T_{DIST}$. The downlink transmission from femto eNB 112 and the uplink transmission from femto UE 122 may then be time aligned at femto eNB 112. However, femto eNB 112 may receive uplink transmission 412 from macro UE 120 at time $-T_{DIST}$. Orthogonality between uplink transmissions 412 and 418 from UEs 120 and 122, respectively, may not be maintained with the transmit timing of femto UE 122 being aligned to the transmit timing of femto eNB 112.

To satisfy condition 2, femto UE 122 may have its transmit timing advanced by $-2T_{DIST}$ relative to the transmit timing of femto eNB 112. Femto UE 122 may send an uplink transmission 420 at time $-T_{DIST}$. Femto eNB 112 may receive uplink transmission 420 from femto UE 122 as well as uplink transmission 412 from macro UE 120 at time $-T_{DIST}$. Orthogonality between uplink transmissions 412 and 420 from UEs 120 and 122, respectively, may be maintained with femto UE 122 having its transmit timing advanced by $-2T_{DIST}$ relative to the transmit timing of femto eNB 112.

To satisfy condition 3, the time interval from $-T_{DIST}$ to $T_{DIST}$ may be defined as a guard interval. This guard interval may be used whenever there is a switch from a downlink subframe to an uplink subframe, as described below.

Femto eNB 112 may adjust its transmit timing (e.g., delay its transmit timing by $T_{DIST}$) in various manners to satisfy condition 1. Femto eNB 112 may also adjust the transmit timing of femto UE 122 (e.g., advance the transmit timing by $2T_{DIST}$) in various manners to satisfy condition 2.

In a first design of timing adjustment, femto eNB 112 may implicitly or explicitly determine $T_{DIST}$ based on a downlink transmission from macro eNB 110. Femto eNB 112 may receive downlink transmission 410 from macro eNB 110, e.g., in similar manner as macro UE 120. Femto eNB 112 may determine that downlink transmission 410 is received at time $T_{DIST}$ and may then set its transmit timing equal to $T_{DIST}$ determined by the receive path for macro eNB 110. In this design, the transmit timing of femto eNB 112 may be advanced relative to the transmit timing of macro eNB 110 even though the transmit timing of macro eNB 110 may not be explicitly determined.

For the first design, femto eNB 112 may assume that downlink transmission 410 was sent by macro eNB 110 at a reference time, e.g., GPS time. Femto eNB 112 may then compute $T_{DIST}$ based on the measured receive time and the assumed transmit time of downlink transmission 410. Femto eNB 112 may then delay its transmit timing by $T_{DIST}$ from the reference time. Femto eNB 112 may also advance the transmit timing of femto UE 122 by $T_{DIST}$ from the reference time, which would be equivalent to an advance of $2T_{DIST}$ from the transmit timing of femto eNB 112.

In a second design, femto eNB 112 may determine $T_{DIST}$ based on an uplink transmission from macro UE 120. Femto eNB 112 may measure uplink transmission 412 from macro UE 120 and determine the receive time of uplink transmission 412, which may be approximately equal to the transmit time of uplink transmission 412 because of the close proximity between macro UE 120 and femto eNB 112. Femto eNB 112 may assume that the transmit timing of macro UE 120 has been advanced by $T_{DIST}$ relative to the reference time. Femto eNB 112 may compute $T_{DIST}$ based on the difference between the receive time of uplink transmission 412 and the reference time. Femto eNB 112 may then delay its transmit timing by $T_{DIST}$ relative to the reference time and may also advance the transmit timing of femto UE 122 by $T_{DIST}$ from the reference time.

In a third design, femto eNB 112 may determine $T_{DIST}$ based on location information. Femto eNB 112 may obtain its location, e.g., by performing GPS positioning. Femto eNB 112 may also obtain the location of macro eNB 110, e.g., from system information broadcast by eNB 110 or sent via the backhaul. Femto eNB 112 may compute the distance between eNBs 110 and 112 based on their known locations and may convert the computed distance to a propagation delay of $T_{DIST}$. Femto eNB 112 may assume that macro eNB 110 aligned its transmit timing to the reference time. Femto eNB 112 may then delay its transmit timing by $T_{DIST}$ relative to the reference time. Femto eNB 112 may also advance the transmit timing of femto UE 122 by $T_{DIST}$ from the reference time In a fourth design, femto eNB 112 may determine $T_{DIST}$ based on one-way ranging with macro eNB 110. Femto eNB 112 may send a transmission at a known time (e.g., aligned to GPS time) to macro eNB 110. Macro eNB 110 may receive the transmission from femto eNB 112 and may measure the propagation delay of $T_{DIST}$ based on the measured receive time and the known transmit time of the transmission from femto eNB 112. Macro eNB 110 may then send a message with the measured propagation delay to femto eNB 112. Femto eNB 112 may adjust its transmit timing as well as the transmit timing of femto UE 122 based on the measured propagation delay from macro eNB 110.

In a fifth design, femto eNB 112 may determine $T_{DIST}$ based on two-way ranging with macro eNB 110. Femto eNB 112 may send a transmission to macro eNB 110, which may return the transmission back to femto eNB 112. Femto eNB 112 may measure a round trip delay (RTD) based on the receive time of the return transmission from macro eNB 110 and the transmit time of the original transmission from femto eNB 112. Femto eNB 112 may compute $T_{DIST}$ to be one half of the RTD. Femto eNB 112 may then adjust its transmit timing as well as the transmit timing of femto UE 122 based on the computed $T_{DIST}$.

In a sixth design, femto eNB 112 may determine $T_{DIST}$ based on ranging by UE 120 or 122 with macro eNB 110. UE 120 or 122 may perform one-way ranging with macro eNB 110 (e.g., as described above for the fourth design) and may obtain $T_{DIST}$ from the one-way ranging. UE 120 or 122 may also perform two-way ranging with macro eNB 110 (e.g., as described above for the fifth design) and may obtain RTD from the two-way ranging. UE 120 or 122 may then send the measured $T_{DIST}$ or RTD (directly or indirectly) to femto eNB 112. For example, femto UE 122 may send the measured $T_{DIST}$ or RTD directly to femto eNB 112. Macro UE 120 may send the measured $T_{DIST}$ or RTD to macro eNB 110, which may then forward the measured $T_{DIST}$ or RTD to femto eNB 112 via the backhaul or over the air. In any case, femto eNB 112 may delay its transmit timing and may advance the transmit timing of femto UE 122 based on the measured $T_{DIST}$ or RTD.

Ranging by UE 120 or 122 with macro eNB 110 may be initiated and performed in various manners. In one design, femto eNB 112 may request UE 120 or 122 to perform ranging with macro eNB 110 and to send the $T_{DIST}$ or RTD to femto eNB 112. In another design, femto eNB 112 may communicate with macro eNB 110, e.g., via a backhaul or over the air. Macro eNB 110 may then request UE 120 or 122 to perform ranging with macro eNB 110.

In a seventh design, femto eNB 112 may determine $T_{DIST}$ based on ranging by macro eNB 110 with UE 120 or 122. Macro eNB 110 may perform one-way ranging with macro UE 120 (e.g., as described above for the fourth design) and may obtain $T_{DIST}$ from the one-way ranging. Macro eNB 110 may also perform two-way ranging with macro UE 120 (e.g., as described above for the fifth design) and may obtain RTD from the two-way ranging. Macro eNB 110 may then send the measured $T_{DIST}$ or RTD (directly or indirectly) to femto eNB 112. Femto eNB 112 may then delay its transmit timing and may advance the transmit timing of femto UE 122 based on the measured $T_{DIST}$ or RTD.

Ranging by macro eNB 110 may be initiated and performed in various manners. In one design, femto eNB 112 may request macro eNB 110 to perform ranging with UE 120 or 122. In another design, femto eNB 112 may request UE 120 or 122 to ask macro eNB 110 to perform ranging with UE 120 or 122.

In an eight design, femto eNB 112 may determine $T_{DIST}$ based on a coarse approximation. For example, femto eNB 112 may obtain a coarse estimate of $T_{DIST}$ based on a reference signal received power (RSRP) on the downlink for macro eNB 110. Since macro eNB 110 broadcasts information about its transmit power for the reference signal, femto eNB 112 can estimate signal propagation pathloss as a ratio of the transmit power of macro eNB 110 to the RSRP measured by femto eNB 112. The estimated pathloss may be used to estimate the distance between macro eNB 110 and femto eNB 112.

Femto eNB 112 may also determine $T_{DIST}$ in other manners. In one design, $T_{DIST}$ may be determined when femto eNB 112 is powered up and may be used to adjust the transmit timing of femto eNB 112. $T_{DIST}$ may be fairly constant for femto eNB 112, and the transmit timing of femto eNB 112 may not change much once it is set properly. $T_{DIST}$ may be determined again if necessary, e.g., if femto eNB 112 is moved to a new location, which may be sufficiently far from the prior location.

Figure 5:
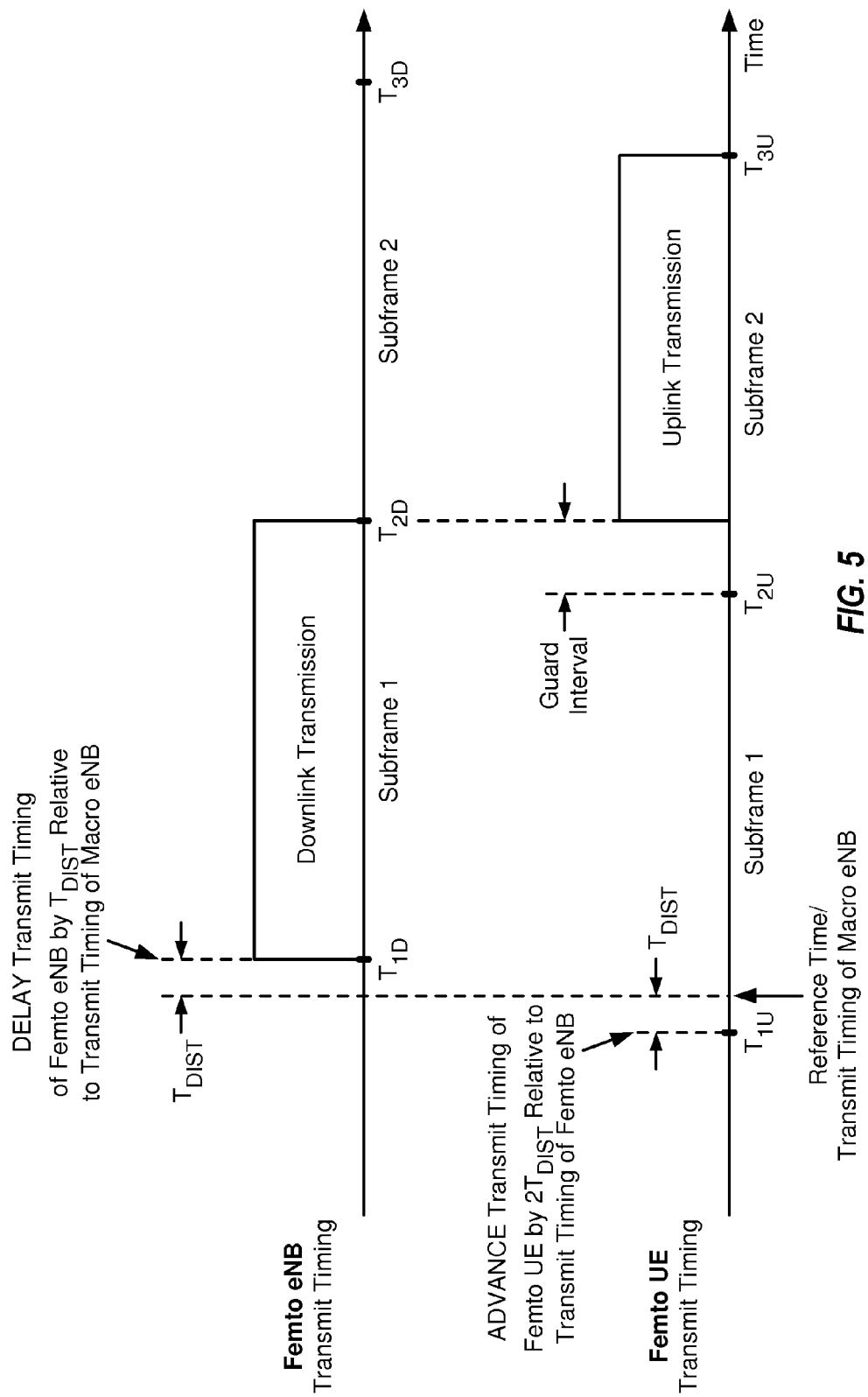
FIG. 5 shows a timing diagram for a femto base station and a femto UE.

FIG. 5 shows a timing diagram for femto eNB 112 and femto UE 122 with timing adjustment to satisfy conditions 1 and 2 for TDD. Femto eNB 112 may have its transmit timing delayed by $T_{DIST}$ relative to the reference time, which may be GPS time, or the transmit timing of macro eNB 110, or some other time. From the perspective of femto eNB 112, subframe 1 may start at time $T_{1D}$, subframe 2 may start at time $T_{2D}$, etc. Femto UE 122 may have its transmit timing advanced by $T_{DIST}$ relative to the reference time. From the perspective of femto UE 122, subframe 1 may start at time $T_{1U}$, subframe 2 may start at time $T_{2U}$, etc. Time $T_{1U}$ may be earlier than time $T_{1D}$ by $2T_{DIST}$.

Femto eNB 112 may send a downlink transmission to femto UE 122 in subframe 1. A switch from downlink to uplink may occur after subframe 1. Femto UE 122 may then send an uplink transmission to femto eNB 112 in subframe 2. Subframe 2 on the uplink may overlap subframe 1 on the downlink from time $T_{2U}$ to time $T_{2D}$. A guard interval may be defined from time $T_{2U}$ to time $T_{2D}$ and may have a duration of $2T_{DIST}$. Femto UE 122 may avoid transmitting during the guard interval in order to avoid interfering with the downlink transmission from femto eNB 112. In general, the first uplink subframe following a downlink subframe may be reduced by $2T_{DIST}$ due to the guard interval.

In one design, a guard interval from $-T_{DIST,MAX}$ to $T_{DIST,MAX}$ centered at the reference time may be used, where $T_{DIST,MAX}$ may be determined based on the cell size of macro eNB 110. This design may ensure that conditions 3 and 4 can be satisfied regardless of where femto eNB 112 is located relative to macro eNB 110.

In one design, the guard interval from $-T_{DIST,MAX}$ to $T_{DIST,MAX}$ or from $-T_{DIST}$ to $T_{DIST}$ may be enabled when femto eNB 112 is within the coverage of macro eNB 110. The guard interval may be reduced to a smaller value (e.g., zero) when femto eNB 112 is not within the coverage of macro eNB 110. This design may avoid a reduction in the size of an uplink subframe following a downlink subframe when the reduction is not necessary.

The transmit timing of femto UE 122 may be advanced in various manners. In one design, femto UE 122 may have its transmit timing advanced by femto eNB 112. Femto UE 122 may send a random access probe when it is within the coverage of femto eNB 112. Femto eNB 112 may receive the random access probe from femto UE 122 and may determine the current transmit timing of femto UE 122 based on the receive time of the random access probe. Femto eNB 112 may determine the desired transmit timing of femto UE 122 to be $2T_{DIST}$ earlier than the transmit timing of femto eNB 112. Femto eNB 112 may then determine a timing adjustment for femto UE 122 based on the difference between the current transmit timing and the desired transmit timing of femto UE 122. Femto eNB 112 may send a random access response with the timing adjustment to femto UE 122. Femto eNB 112 may also periodically determine the transmit timing of femto UE 122 (e.g., every X seconds) and may send relative commands to change (e.g., to advance or delay) the transmit timing of femto UE 122 as necessary.

The transmit timing of femto UE 122 may also be adjusted in other manners. For example, femto UE 122 may determine the propagation delay $T_{DIST}$ using any of the designs described above and may set its transmit timing based on the propagation delay. Femto UE 122 may also measure an uplink transmission from macro UE 120 and may set its transmit timing based on the receive time of the uplink transmission from macro UE 120.

Femto eNB 112 may have a synchronization requirement of $T_{REQ}$, which may be given as $T_{REQ}=T_{DIST}+T_{MARGIN}$, where $T_{MARGIN}$ may be an implementation margin. The synchronization requirement of femto eNB 112 may be satisfied by delaying the transmit timing of femto eNB 112 by $T_{DIST}$, as shown in FIG. 5.

Figure 6:
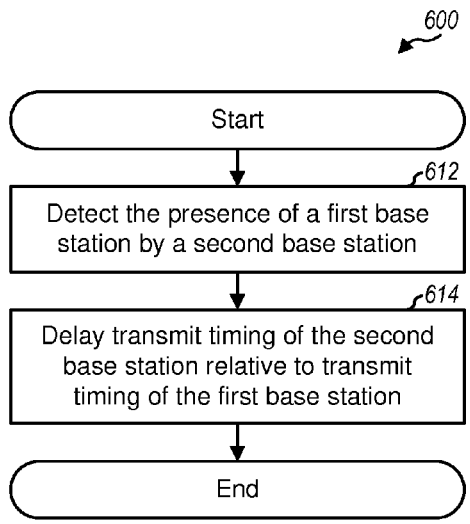
FIGS. 6 and 7 show processes for adjusting transmit timing of a base station.

FIG. 6 shows a design of a process 600 for adjusting transmit timing of a base station/eNB in a wireless network. Process 600 may be performed by a base station or by some other entity. The presence of a first base station may be detected by a second base station (block 612). The transmit timing of the second base station may be delayed relative to the transmit timing of the first base station (block 614).

In one design, a UE located within the coverage of the first and second base stations may be identified. The transmit timing of the second base station may be delayed relative to the transmit timing of the first base station to time align downlink signals from the first and second base stations at the UE. In another design, the transmit timing of the second base station may be delayed by a predetermined amount, which may be equal to the propagation delay (e.g., $T_{DIST,MAX}$) correspond to the cell size of the first base station or some other amount.

In one design, the first base station may be a macro base station and the second base station may be a femto base station. The UE may be a femto UE communicating with the femto base station or a macro UE communicating the macro base station. The UE may be located closer to the femto base station than the macro base station. In other designs, the first and second base stations may be other types of base stations. For example, the second base station may be a pico base station, a relay station, etc.

Figure 7:
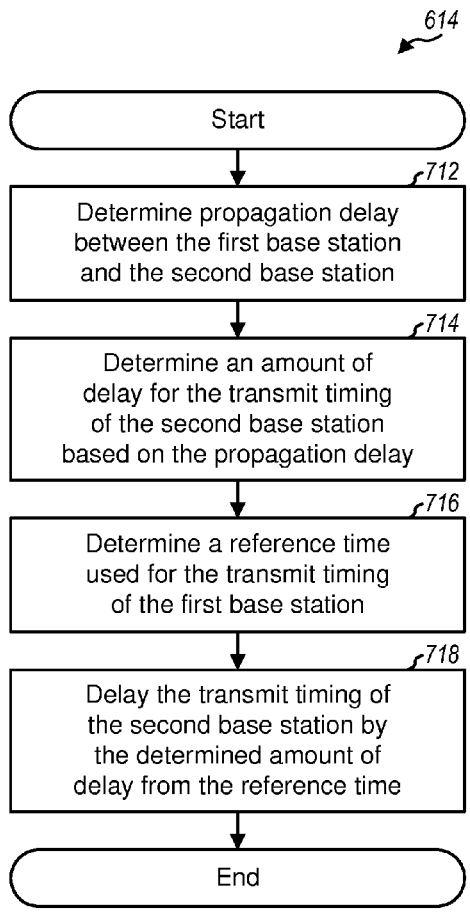

FIG. 7 shows a design of block 614 in FIG. 6. The propagation delay between the first base station and the second base station may be determined (block 712). The amount of delay for the transmit timing of the second base station may be determined based on the propagation delay (block 714). A reference time (e.g., GPS time) used for the transmit timing of the first base station may be determined (block 716). The transmit timing of the second base station may then be delayed by the determined amount of delay from the reference time (block 718).

In one design of block 712, the propagation delay between the first and second base stations may be determined based on the location of the first base station and the location of the second base station. In another design of block 712, the propagation delay between the first and second base stations may be determined based on ranging between the first and second base stations. In yet another design of block 712, the propagation delay between the first base station and a UE within the coverage of the second base station may be determined based on ranging between the first base station and the UE. The propagation delay may also be determined in other manners.

Referring back to FIG. 6, in another design of block 614, the second base station may receive a downlink transmission from the first base station. The second base station may then determine its transmit timing based on (e.g., may align its transmit timing to) the receive time of the downlink transmission from the first base station.

In yet another design of block 614, the second base station may receive an uplink transmission from a UE communicating with the first base station. The UE may have its transmit timing advanced relative to the transmit timing of the first base station. The second base station may determine its transmit timing based on the receive time of the uplink transmission from the UE and the reference time.

Figure 8:
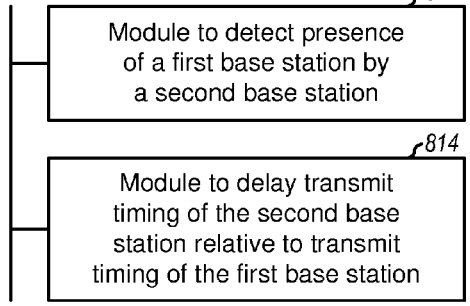
FIG. 8 shows an apparatus for adjusting transmit timing of a base station.

FIG. 8 shows a design of an apparatus 800 for adjusting transmit timing of a base station in a wireless network. Apparatus 800 includes a module 812 to detect the presence of a first base station by a second base station, and a module 814 delay the transmit timing of the second base station relative to the transmit timing of the first base station.

Figure 9:
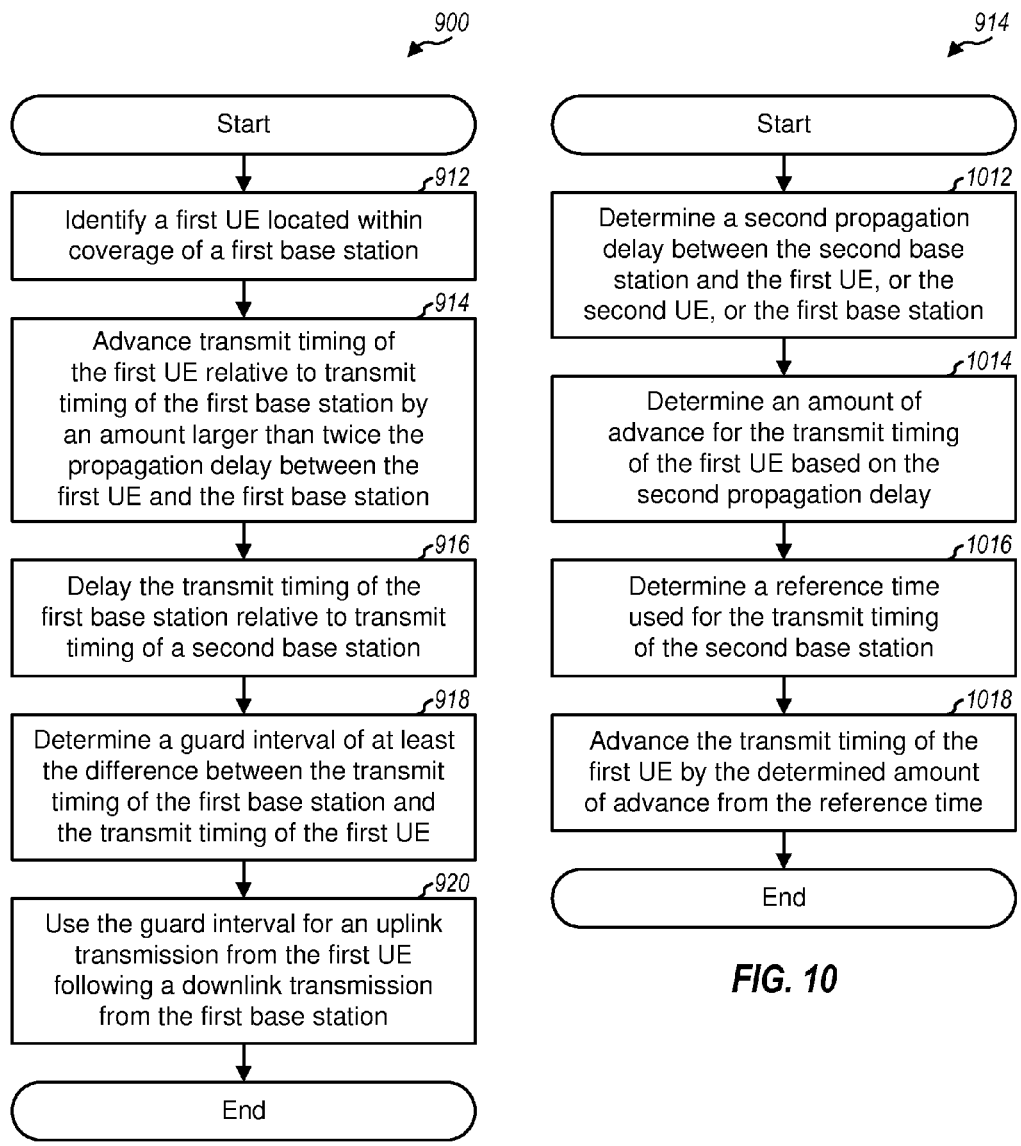

FIG. 9 shows a design of a process 900 for adjusting transmit timing of a UE in a wireless network. Process 900 may be performed by a first base station (as described below) or by some other entity. The first base station may identify a first UE located within the coverage of the first base station (block 912). The first base station may advance the transmit timing of the first UE relative to the transmit timing of the first base station by an amount larger than twice the propagation delay between the first UE and the first base station (block 914).

In one design, the first base station may advance the transmit timing of the first UE to time align uplink signals from the first UE and a second UE at the first base station. The first UE may communicate with the first base station, and the second UE may communicate with a second base station. The first base station may be a femto base station and the second base station may be a macro base station. The first and second UEs may be located closer to the femto base station than the macro base station. In other designs, the first and second base stations and the first and second UEs may be other types of base stations and UEs.

FIG. 10 shows a design of block 914 in FIG. 9. The first base station may determine second propagation delay between the second base station and the first UE, or the second UE, or the first base station, e.g., based on any of the designs described above (block 1012). The first base station may determine the amount of advance for the transmit timing of the first UE based on the second propagation delay (block 1014). The first base station may determine a reference time (e.g., GPS time) used for the transmit timing of the second base station (block 1016). The first base station may then advance the transmit timing of the first UE by the determined amount of advance from the reference time (block 1018).

Referring back to FIG. 9, in another design of block 914, the first base station may receive an uplink transmission from the second UE. The first base station may then determine the transmit timing of the first UE based on (e.g., may align the transmit timing of the first UE to) the receive time of the uplink transmission from the second UE.

In one design, the first base station may receive a random access probe from the first UE and may identify the first UE based on the random access probe. The first base station may determine a timing adjustment for the first UE to time align the uplink signals from the first and second UEs at the first base station. The first base station may then send the timing adjustment to the first UE, e.g., in response to the random access probe.

In one design, the first base station may delay its transmit timing relative to the transmit timing of the second base station, e.g., to time align downlink signals from the first and second base stations at the first and second UEs (block 916). The transmit timing of the first base station may be delayed by a particular amount and the transmit timing of the first UE may be advanced by the same amount relative to the transmit timing of the second base station, e.g., as shown in FIG. 5.

In one design, the first base station may determine a guard interval of at least the difference between its transmit timing and the transmit timing of the first UE (block 918). In one design, the guard interval may be set to a predetermined value (e.g., $T_{DIST,MAX}$), which may be determined based on the cell size of the second base station. The guard interval may be used for an uplink transmission from the first UE following a downlink transmission from the first base station, e.g., as shown in FIG. 5 (block 920).

Figure 11:
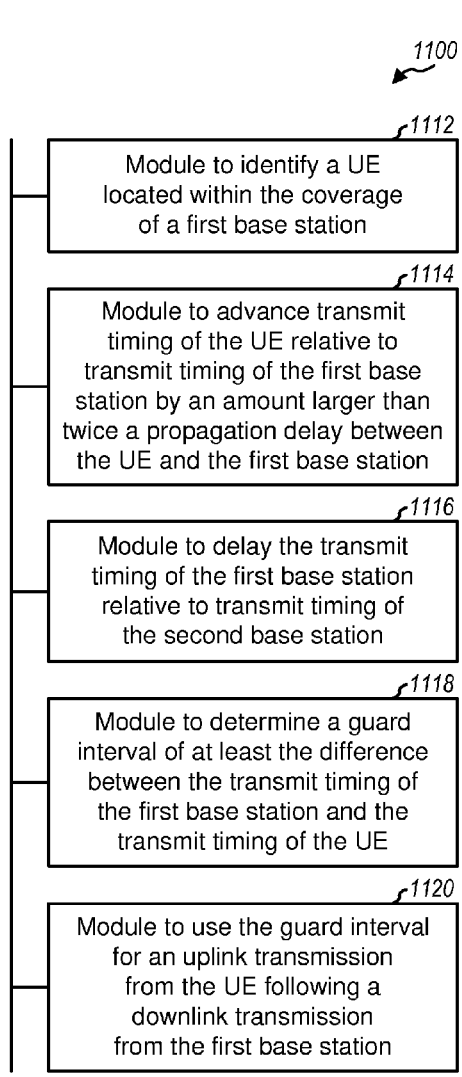
FIG. 11 shows an apparatus for adjusting transmit timing of a UE.

FIG. 11 shows a design of an apparatus 1100 for adjusting transmit timing of a UE in a wireless network. Apparatus 1100 includes a module 1112 to identify a UE located within the coverage of a first base station, a module 1114 to advance transmit timing of the UE relative to transmit timing of the first base station by an amount larger than twice a propagation delay between the UE and the first base station, a module 1116 to delay the transmit timing of the first base station relative to transmit timing of a second base station, a module 1118 to determine a guard interval of at least the difference between the transmit timing of the first base station and the transmit timing of the UE, and a module 1120 to use the guard interval for an uplink transmission from the UE following a downlink transmission from the first base station.

Figure 12:
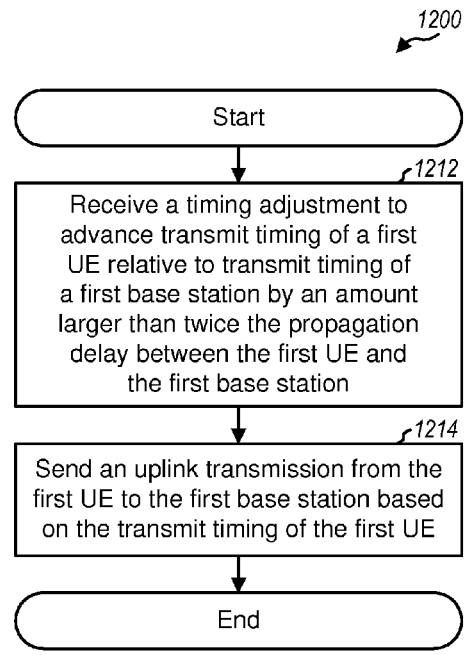
FIG. 12 shows a process for communication by a UE.

FIG. 12 shows a design of a process 1200 for communication in a wireless network. Process 1200 may be performed by a first UE (as described below) or by some other entity. The first UE may receive a timing adjustment to advance its transmit timing relative to the transmit timing of a first base station by an amount larger than twice the propagation delay between the first UE and the first base station (block 1212). The first UE may send an uplink transmission to the first base station based on the transmit timing of the first UE (block 1214).

In one design, the transmit timing of the first UE may be advanced to time align uplink signals from the first UE and a second UE at the first base station. The first UE may be located within the coverage of the first base station and a second base station. In one design, the first base station may be a femto base station and the second base station may be a macro base station. The first UE may communicate with the femto base station, and the second UE may communicate with the macro base station. The first and second UEs may be located closer to the femto base station than the macro base station. In other designs, the first and second base stations and the first and second UEs may be other types of base stations and UEs.

In one design, the first UE may send a random access probe and may receive the timing adjustment from the first base station in response to the random access probe. The timing adjustment may also be sent to the first UE in response to some other action.

In one design, the first base station may determine the timing adjustment without any interaction with the first UE. In another design, the first UE may perform ranging with the second base station to determine a second propagation delay between the second base station and the first UE. The transmit timing of the first UE may then be advanced by an amount determined based on the second propagation delay.

Figure 13:
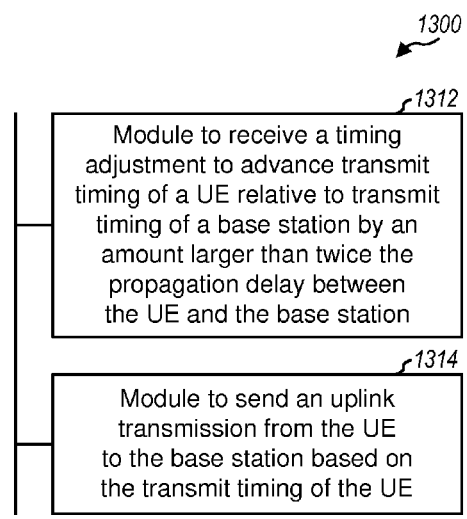
FIG. 13 shows an apparatus for communication by a UE.

FIG. 13 shows a design of an apparatus 1300 for communication in a wireless network. Apparatus 1300 includes a module 1312 to receive a timing adjustment to advance the transmit timing of a UE relative to the transmit timing of a base station by an amount larger than twice the propagation delay between the UE and the base station, and a module 1314 to send an uplink transmission from the UE to the base station based on the transmit timing of the UE.

The modules in FIGS. 8, 11 and 13 may comprise processors, electronic devices, hardware devices, electronic components, logical circuits, memories, software codes, firmware codes, etc., or any combination thereof.

Figure 14:
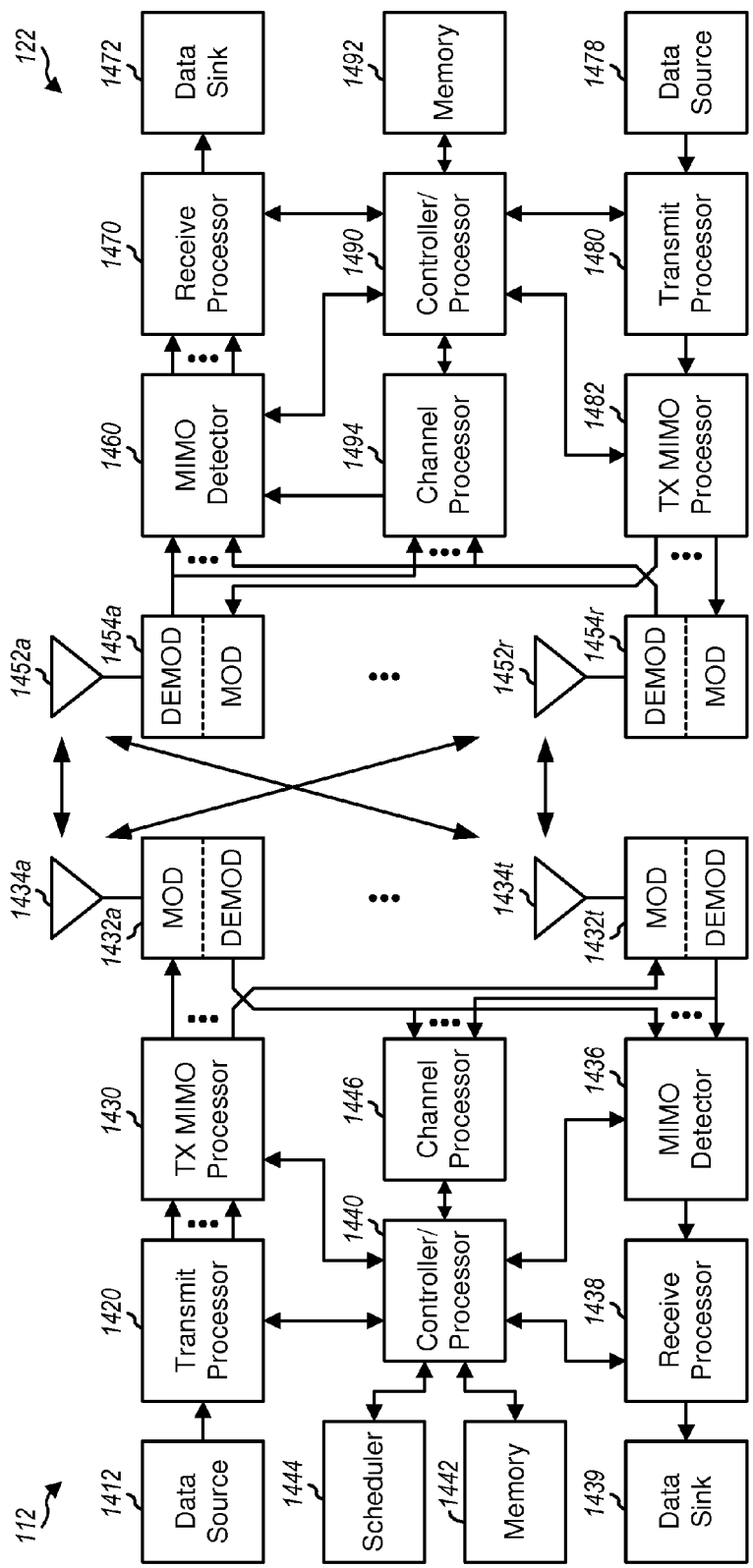
FIG. 14 shows a block diagram of a base station and a UE.

FIG. 14 shows a block diagram of a design of base station/eNB 112 and UE 122 in FIGS. 1 and 3. Base station 112 may be equipped with T antennas 1434a through 1434t, and UE 122 may be equipped with R antennas 1452a through 1452r, where in general T≥1 and R≥1.

At base station 112, a transmit processor 1420 may receive data for one or more UEs from a data source 1412, process (e.g., encode and modulate) the data for each UE based on one or more modulation and coding schemes, and provide data symbols for all UEs. Transmit processor 1420 may also receive control information (e.g., timing adjustment for UE 122) from a controller/processor 1440, process the control information, and provide control symbols. Transmit processor 1420 may also generate reference symbols for a reference signal or pilot. A transmit (TX) multiple-input multiple-output (MIMO) processor 1430 may perform spatial processing (e.g., precoding) on the data symbols, the control symbols, and/or the reference symbols, if applicable, and may provide T output symbol streams to T modulators (MOD) 1432a through 1432t. Each modulator 1432 may process a respective output symbol stream (e.g., for OFDM, etc.) to obtain an output sample stream. Each modulator 1432 may further process (e.g., convert to analog, amplify, filter, and upconvert) the output sample stream to obtain a downlink signal. T downlink signals from modulators 1432a through 1432t may be transmitted via T antennas 1434a through 1434t, respectively.

At UE 122, R antennas 1452a through 1452r may receive the downlink signals from base station 112 and possibly other base stations and may provide received signals to demodulators (DEMOD) 1454a through 1454r, respectively. Each demodulator 1454 may condition (e.g., filter, amplify, downconvert, and digitize) its received signal to obtain received samples and may further process the received samples (e.g., for OFDM, etc.) to obtain received symbols. A MIMO detector 1460 may perform MIMO detection (if applicable) on the received symbols from all R demodulators 1454a through 1454r and provide detected symbols. A receive processor 1470 may process (e.g., demodulate and decode) the detected symbols, provide decoded data for UE 122 to a data sink 1472, and provide decoded control information to a controller/processor 1490.

On the uplink, at UE 122, data from a data source 1478 and control information (e.g., random access probe) from controller/processor 1490 may be processed by a transmit processor 1480, precoded by a TX MIMO processor 1482 (if applicable), conditioned by modulators 1454a through 1454r, and transmitted via antennas 1452a through 1452r. At base station 112, the uplink signals from UE 122 and other UEs may be received by antennas 1434, conditioned by demodulators 1432, detected by a MIMO detector 1436, and processed by a receive processor 1438 to obtain the data and control information transmitted by UE 122 and other UEs. Processor 1438 may provide the recovered data to a data sink 1439 and the recovered control information to controller/processor 1440.

Controllers/processors 1440 and 1490 may direct the operation at base station 112 and UE 122, respectively. A channel processor 1494 may receive downlink transmissions from base stations and determine the receive time of the downlink transmissions. A channel processor 1446 may receive transmissions from UEs and possibly other base stations and determine the receive time of the transmissions. Processor 1440 and/or other processors and modules at base station 112 may perform or direct process 600 in FIG. 6, process 614 in FIG. 7, process 900 in FIG. 9, process 914 in FIG. 10, and/or other processes for the techniques described herein. Processor 1490 and/or other processors and modules at UE 122 may perform or direct process 1200 in FIG. 12 and/or other processes for the techniques described herein. Memories 1442 and 1492 may store data and program codes for base station 112 and UE 122, respectively. A scheduler 1444 may schedule UEs for transmission on the downlink and/or uplink and may assign resources to the scheduled UEs.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
identifying a first user equipment (UE) located within a coverage of a first base station;
advancing a transmit timing of the first UE relative to a transmit timing of the first base station by an amount larger than twice a propagation delay between the first UE and the first base station; and
delaying the transmit timing of the first base station relative to a transmit timing of a second base station in communication with a second UE within the coverage of the first base station.

2. The method of claim 1, wherein advancing the transmit timing of the first UE comprises advancing the transmit timing of the first UE to time align uplink signals from the first UE and the second UE at the first base station.

3. The method of claim 2, wherein the first base station is a femto base station and the second base station is a macro base station, and wherein the first UE communicates with the femto base station.

4. The method of claim 2, wherein advancing the transmit timing of the first UE comprises:
determining a second propagation delay between the second base station and one of the first UE, the second UE, or the first base station, and
determining an amount of advance for the transmit timing of the first UE based on the second propagation delay.

5. The method of claim 2, wherein advancing the transmit timing of the first UE comprises:
receiving an uplink transmission from the second UE at the first base station, and
determining the transmit timing of the first UE based on a receive time of the uplink transmission from the second UE at the first base station.

6. The method of claim 2, wherein advancing the transmit timing of the first UE comprises:
determining a timing adjustment for the first UE to time align the uplink signals from the first UE and the second UE at the first base station, and
sending the timing adjustment to the first UE.

7. The method of claim 6, wherein the identifying the first UE comprises receiving a random access probe from the first UE at the first base station, and wherein the timing adjustment is determined and sent to the first UE in response to the random access probe.

8. The method of claim 1, wherein the transmit timing of the first base station is delayed by a particular amount and the transmit timing of the first UE is advanced by the particular amount relative to the transmit timing of the second base station.

9. The method of claim 1, further comprising:
determining a guard interval of at least a difference between the transmit timing of the first base station and the transmit timing of the first UE; and
using the guard interval for an uplink transmission from the first UE following a downlink transmission from the first base station.

10. The method of claim 9, wherein the guard interval is set to a value determined based on a cell size of a second base station.

11. An apparatus for wireless communication, comprising:
means for identifying a first user equipment (UE) located within a coverage of a first base station;
means for advancing a transmit timing of the first UE relative to a transmit timing of the first base station by an amount larger than twice a propagation delay between the first UE and the first base station; and
means for delaying the transmit timing of the first base station relative to a transmit timing of a second base station in communication with a second UE within the coverage of the first base station.

12. The apparatus of claim 11, wherein the means for advancing the transmit timing of the first UE comprises means for advancing the transmit timing of the first UE to time align uplink signals from the first UE and the second UE at the first base station.

13. The apparatus of claim 12, wherein the means for advancing the transmit timing of the first UE comprises
means for determining a second propagation delay between the second base station and one of the first UE, or the second UE, or the first base station, and
means for determining an amount of advance for the transmit timing of the first UE based on the second propagation delay.

14. The apparatus of claim 1, wherein the means for advancing the transmit timing of the first UE comprises
means for receiving an uplink transmission from the second UE at the first base station, and
means for determining the transmit timing of the first UE based on a receive time of the uplink transmission from the second UE at the first base station.

15. The apparatus of claim 12, wherein the means for advancing the transmit timing of the first UE comprises
means for determining a timing adjustment for the first UE to time align the uplink signals from the first UE and the second UE at the first base station, and
means for sending the timing adjustment to the first UE.

16. The apparatus of claim 11, further comprising:
means for determining a guard interval of at least a difference between the transmit timing of the first base station and the transmit timing of the first UE; and
means for using the guard interval for an uplink transmission from the first UE following a downlink transmission from the first base station.

17. An apparatus for wireless communication, comprising:
at least one processor configured to identify a user equipment (UE) located within a coverage of a base station, to advance a transmit timing of the UE relative to a transmit timing of the base station by an amount larger than twice a propagation delay between the UE and the base station, and to delay the transmit timing of the first base station relative to a transmit timing of a second base station in communication with a second UE within the coverage of the first base station.

18. A non-transitory computer readable medium storing code for wireless communication, the code comprising instructions executable by a processor to:
identify a user equipment (UE) located within a coverage of a base station,
advance a transmit timing of the UE relative to a transmit timing of the base station by an amount larger than twice a propagation delay between the UE and the base station; and
delay the transmit timing of the first base station relative to a transmit timing of a second base station in communication with a second UE within the coverage of the first base station.

19. A method for wireless communication, comprising:
sending a random access probe from a first user equipment (UE);
receiving, in response to the random access probe, a timing adjustment to advance a transmit timing of the first UE relative to a transmit timing of a first base station by an amount larger than twice a propagation delay between the first UE and the first base station; and
sending an uplink transmission from the first UE to the first base station based on the transmit timing of the first UE.

20. The method of claim 19, wherein the transmit timing of the first UE is advanced to time align uplink signals from the first UE and a second UE at the first base station, the first UE being located within coverage of the first base station and a second base station, and the second UE communicating with the second base station.

21. The method of claim 20, further comprising:
performing ranging between the first UE and the second base station to determine a second propagation delay between the second base station and the first UE, wherein the transmit timing of the first UE is advanced by an amount determined based on the second propagation delay.

22. An apparatus for wireless communication, comprising:
means for sending a random access probe from a first user equipment (UE);
means for receiving, in response to the random access probe, a timing adjustment to advance a transmit timing of the first UE relative to a transmit timing of a first base station by an amount larger than twice a propagation delay between the first UE and the first base station; and means for sending an uplink transmission from the first UE to the first base station based on the transmit timing of the first UE.

23. The apparatus of claim 22, wherein the transmit timing of the first UE is advanced to time align uplink signals from the first UE and a second UE at the first base station, the first UE being located within coverage of the first base station and a second base station, and the second UE communicating with the second base station.

24. The apparatus of claim 23, further comprising:

means for performing ranging between the first UE and the second base station to determine a second propagation delay between the second base station and the first UE, wherein the transmit timing of the first UE is advanced by an amount determined based on the second propagation delay.

25. An apparatus for wireless communication, comprising:

at least one processor configured to send a random access probe from a first user equipment (UE), to receive, in response to the random access probe, a timing adjustment to advance a transmit timing of the first UE relative to a transmit timing of a first base station by an amount larger than twice a propagation delay between the first UE and the first base station, and to send an uplink transmission from the first UE to the first base station based on the transmit timing of the first UE.

26. A non-transitory computer readable medium storing code for wireless communication, the code comprising instructions executable by a processor to:

send a random access probe from a first user equipment (UE);

receive a timing adjustment to advance a transmit timing of the first UE relative to a transmit timing of a first base station by an amount larger than twice a propagation delay between the first UE and the first base station, and send an uplink transmission from the first UE to the first base station based on the transmit timing of the first UE.

* * * * *